United States Patent [19]

Pellegrinelli

[11] Patent Number: 5,085,139
[45] Date of Patent: Feb. 4, 1992

[54] AUTOMATIC EGG SHELLING MACHINE ON CONTINUOUS PARALLEL LINES, CIRCULATING ON VERTICAL PLANES

[75] Inventor: Giorgio Pellegrinelli, Brugherio, Italy

[73] Assignee: Pelbo S.r.l., Brugherio, Italy

[21] Appl. No.: 474,039

[22] PCT Filed: Sep. 30, 1988

[86] PCT No.: PCT/IT88/00069

§ 371 Date: May 17, 1990

§ 102(e) Date: May 17, 1990

[87] PCT Pub. No.: WO89/05097

PCT Pub. Date: Jun. 15, 1989

[30] Foreign Application Priority Data

Nov. 30, 1987 [IT] Italy ................. 22810 A/87

[51] Int. Cl.$^5$ ................. A23J 1/09; A47J 43/14
[52] U.S. Cl. ................. 99/500; 99/497; 99/577; 99/582
[58] Field of Search ................. 99/495–500, 99/568, 577, 578, 581, 582; 426/299, 478–480

[56] References Cited

U.S. PATENT DOCUMENTS

| 3,029,849 | 4/1962 | Willsey | 99/500 |
|---|---|---|---|
| 3,185,194 | 5/1965 | Ellis et al. | 99/500 |
| 4,134,333 | 1/1979 | Warren | 99/498 |
| 4,137,838 | 2/1979 | Warren | 99/582 |
| 4,321,864 | 3/1982 | Willsey | 99/577 |
| 4,534,284 | 8/1985 | Fujimura et al. | 99/498 |
| 4,764,387 | 8/1988 | Willsey | 426/299 |
| 4,773,322 | 9/1988 | Willsey | 99/499 |

FOREIGN PATENT DOCUMENTS 1920390 3/1977 Fed. Rep. of Germany .
2315770 3/1977 Fed. Rep. of Germany .
210847 11/1984 Japan .

Primary Examiner—Timothy F. Simone
Attorney, Agent, or Firm—Michael J. Striker

[57] ABSTRACT

Automatic egg shelling machine (10) comprising two or more continuous production lines (A, B, C, D, E, F) to permit cyclic circulation of the various egg shelling devices (61) and the yolk and white collecting devices (62) on vertical parallel planes, each production line (A, B, C, D, E, F) being in turn composed of two half-circuits one above the other on the same vertical plane, the first to carry and move along the selling devices (61) and the second, below the first, to carry and move along the collecting devices (62), a shelling device (61) and a collecting device (62) meeting each other cyclically on the front (33) of the machine (10) on each production line (A, B, C, D, E, F) timed to meet at the moment when each egg is placed on the shelling device (61) by an external egg feeding machine, means being provided to break the shell, separate the two halves of the shell, discharge the broken shells, the egg white and the yolk into special containers (181) (182), and hand operated means to allow any waste to be discharged into another container (180).

3 Claims, 6 Drawing Sheets

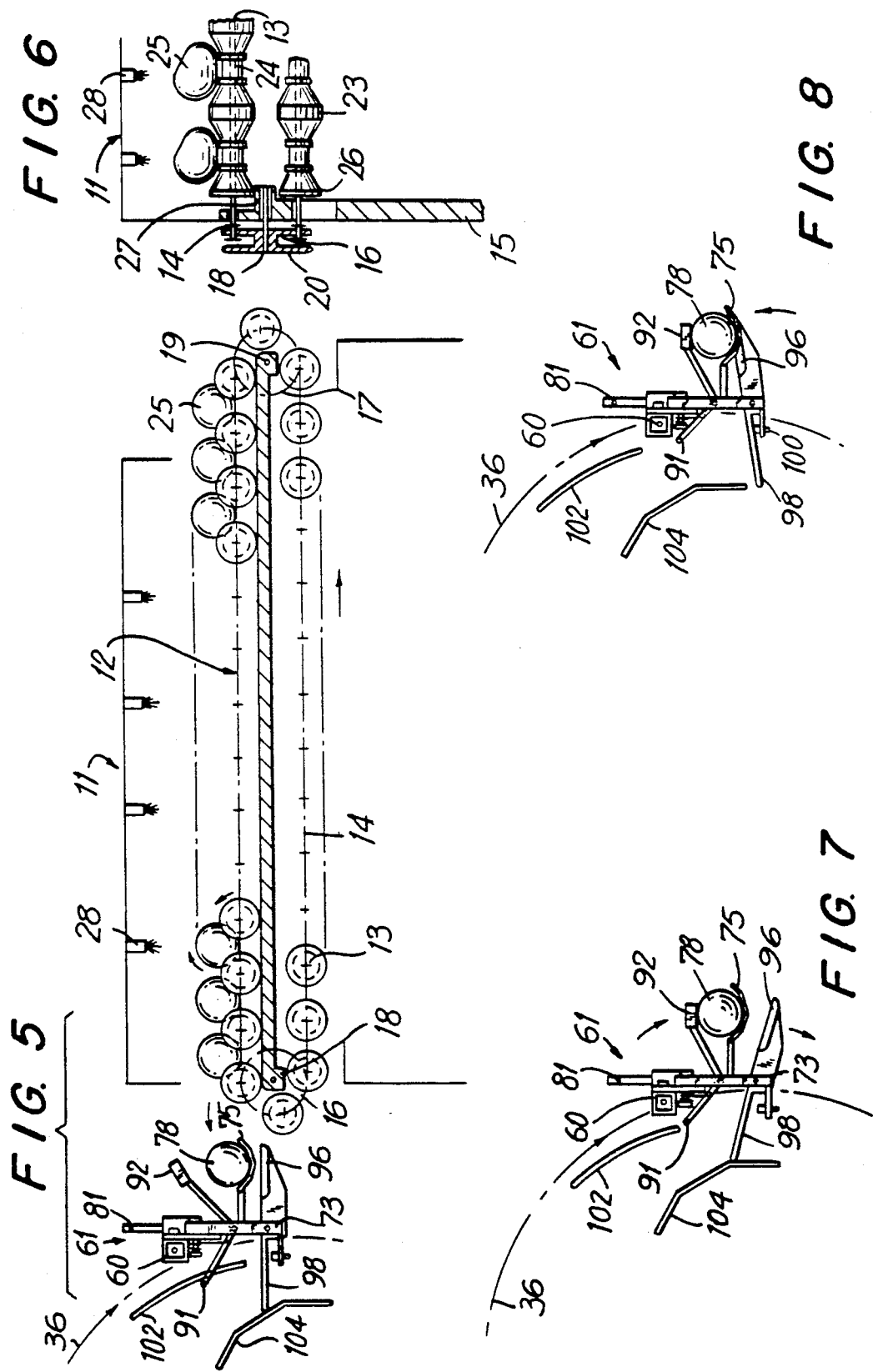

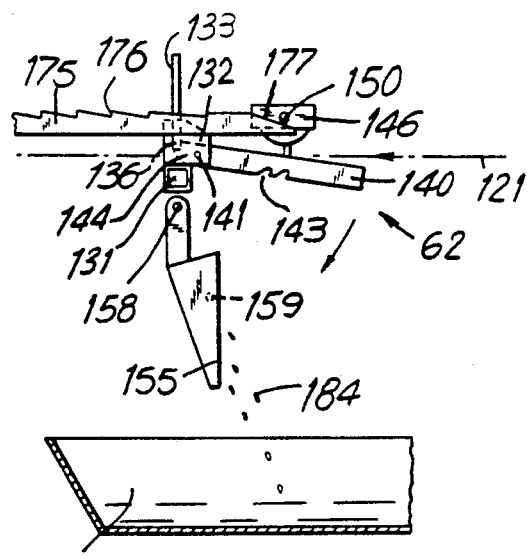
FIG. 13
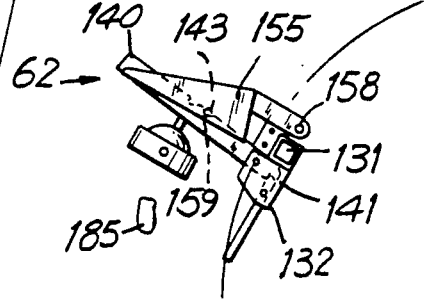
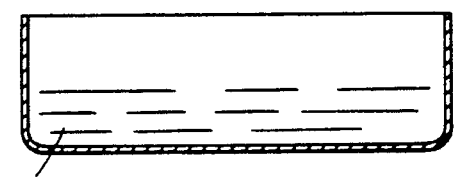
FIG. 14
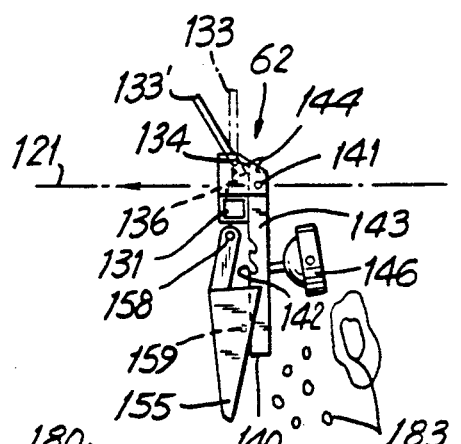
FIG. 15

AUTOMATIC EGG SHELLING MACHINE ON CONTINUOUS PARALLEL LINES, CIRCULATING ON VERTICAL PLANES

BACKGROUND OF THE INVENTION

Automatic machines are already known for shelling eggs and collecting the yolks separated from the whites. These machines comprise a number of devices, substantially similar, placed one after another to deal with eggs fed on one at a time by a special feed system. The form given to these machines is generally circular. For reasons of space it is therefore impossible to increase output to any great extend as the diameter of the circle cannot be widened beyond certain limits.

Neither could the machinery be arranged in a number of concentric circular lines or in several lines on different planes for obvious reasons of mechanical and functional incompatibility among the various devices.

Were either of these arrangements to be tried it would be practically impossible to maintain control over the various operations and so over the sequence of movements for each egg.

Machines at present in use have a low hourly output, are subject to operational difficulties, are bulky and costly to run, bearing in mind the amount of waste and consequent irregular output.

SUMMARY OF THE INVENTION

The present invention avoids these drawbacks offering considerable advantages as well that will be described herein. Subject of the invention is an automatic egg-shelling machine in which the continuous production line revolves on vertical planes carrying with it the movements in sequence of the devices for breaking the shell and collecting the yolk and white.

In this way it is possible to have two or more production lines operating parallel to each other side by side, each line having the same devices foe shelling and collection, the means for obtaining cyclic movement and control, common to the various devices, being aligned transversally on said lines.

The egg feeder also has two or more lines, parallel and set side by side, for carrying in and washing the eggs, operating on vertical planes. Their number and spacing are the same as for the shelling lines to which eggs can therefore be supplied line by line.

Each production line comprises two "half-circuits" one above the other on the same vertical plane, one carrying the shelling device and the other carrying the yolk and white collecting device.

Said devices are drawn along in the cycle by continuous chains.

In each production line the heights of the two half-circuits for shelling and collecting devices. The speed and spacing of said devices on each half-circuit, the direction of movement of one half-circuit and the other, are all such that, on the front of the machine, a shelling device and below it a collecting device are time to take up these corresponding positions, on each production line, with the moment of transfer of each egg from the feeder to the shelling device, the front of said feeder substantially matching with the front of the main machine.

On the front of the machine the shelling device makes a downward movement while the collecting device makes an upward movement.

The chief components of each shelling device are:
a curved pan, in two halves placed side by side, to support each egg, each half-pan fixed to one of two symmetrical jaws;
two parallel blades, facing upwards and located side by side, between the two half-pans;
a head placed centrally above to rest on the egg.

Jaw articulation axes are substantially parallel to the shelling device's direction of movement.

The half-pans and the head each have an arm whose axes of articulation are substantially parallel and are perpendicular to the direction of feed.

The machine is equipped with means for:
moving the half-pans, before receiving the egg from the feeder, away from both the pressing head and from the blades until the collecting device lies below the shelling device;
lowering the head onto the egg when the collecting device is in position below the sheller, and bringing the blades up sharply to hit the egg between the two half-pans;
moving the jaws apart together with the half pans each with its blade;
returning the shelling components to their original positions to start a fresh cycle when one is completed.

In the way the following sequence of operations occurs:
the shell is broken into two halves;
the two halves are separated;
the white and yolk fall into the collecting devices;
shelling and collecting device movements continue inside the machine.

The means for moving away the pressure head and the blades from the half-pans, and for subsequently breaking the shell to allow the contents to fall, consist of fixed cams on the front of the machine, against which cams the back ends of the arms, respectively supporting the head and half-pans, react on overcoming resistance from return springs. Said cams function along a trajectory slightly preceding the zone in which the egg is placed on the half-pans and extending to the zone in which the head moves down and the blades rise to cut the shell.

The jaws supporting the half-pans and blades are moved apart by a free slider moving vertically in the zone between the jaws. The slider has an upper head with two short side arms, aligned and symmetrical to the slider's axis, there being another horizontal arm at its lower end. This lower horizontal arm has two heads, one at each end, for pressing against the inclined planes opposite one another on the jaws.

On the front of the machine, practically at the lower ends of the cams controlling the pressure head and blades, a rotor is mounted horizontally. The rotor has longitudinal radial blades, the edge of each blade dividing to form an outward-facing channel.

Said rotor revolves continually. Its rotation is timed at a speed ration suited to the lines on which the shelling device operates so that, when a shelling device on one line has just passed the rotor. The channel of one blade follows the movement of the slider head and, preceding the shelling device, applies a thrust to the slider head as soon as the egg shell has been broken. This thrust passing into the slider causes the ends of said slider's lower horizontal bar to react against the inclined planes of the jaws moving them apart.

Proceeding inside the machine after breaking the shell, the shelling device encounters, at the level of the broken shell, a ferrule or similar means placed above an Archimedean screw lying in a channel. The ferrule hits the shell causing it to fall into the channel where the Archimedean screw carries it outside the machine into a container.

The means for bringing the jaws together in their original position are parallel upward-inclined guides supported by a bar fixed to the front of the machine immediately above the lines carrying the shelling devices.

Position and orientation of said guides are such as to permit the slider to pass between them while the two short arms on said slider's head pass above said guides. As the shelling device moves along, upward inclination of said guides therefore raises the slider's head together with its lower cross arm which moves away from the inclined planes of the jaws which then resume their closed position pushed by return springs.

The collecting device comprises a cup to catch the yolk and white and is shaped with a central depression to retain the yolk while the white slips down, into a tray underneath, through slits round the sides of the cup. Said cup is supported on an articulated arm at its back and is held in a substantially horizontal position by contact at the back against the lower end of a vertical lever pressed by a spring against the cup's supporting arm.

The tray below articulates on a lever having a posterior fulcrum and is kept practically horizontal by a side pin that fits into a notch in the arm supporting the cup. The position of said notch in relation to articulation of the tray and of said lever is such as to keep the tray level so that the egg white stays in it.

When the yolk is in the cup and the white in the tray, the collecting device moves inside the machine. In so doing it encounters a horizontal longitudinal cam whose initial upward-inclined end carries the device onto a set of saw teeth, also upward-inclined, over which passes a horizontal pin on the other side of the cup.

Said inclined end raises both the cup and its supporting arm until the short pin in the side of the tray is released from the notch in said arm.

Deprived of its support the tray overturns and the egg white falls into a container under the machine.

Any white left in the cup is helped to fall by the shaking given the cam's saw teeth to the pin in the cup which force of gravity causes to slide across said teeth. Having passed the toothed cam, the collecting device encounters another longitudinal cam. The cam has an upward inclined plane which, by means of contact with the pin in the tray, causes said tray to return to its horizontal position with its short pin once more in the notch in the cup's supporting arm.

The collecting device then begins its downward travel, passing from that section of the chain moving towards the back of the machine to that section moving toward the front of the machine, during which travel it overturns completely causing the yolk to fall out of the cup into a container. By moving the vertical lever keeping the cup's supporting arm practically horizontal, said arm can be rotated so as to release the short pin in the tray from the notch in said arm's under side.

By doing this both the cup and the tray tip over allowing anything left in them to fall into a waste container below. Should a check on the machine be needed because of some irregularity in an egg or in shelling and collecting it, said lever can be used to free the collecting device from any such undesirable material.

A fixed longitudinal cam is placed on the trajectory followed by the collecting device, immediately beyond the container for catching waste. The cam has an upwardly inclined plane over which the tray's short side pin slides raising the tray and itself until it fits into a second notch in the cup's supporting arm further away from the articulation than the first notch.

The cup and tray are thus stabilized in a position where the pin in the cup lies below the toothed cam placed for shaking the cup containing yolk. Therefore in moving to the back of the machine the collecting device is not shaken by said cam.

The cam with inclined plane placed immediately beyond the toothed cam further lifts the tray's short pin to fit it into the first notch in the cup's supporting arm, namely the notch nearest to said arm's articulation, and these movements put the collecting device into position for a fresh cycle.

Each of the shelling and of the collecting devices on the various parallel production lines are mounted on their respective transversal bars, or on similar means, and are pulled along by chains or similar means.

The number of said bars is the same as the number of shelling devices and as the number of collecting devices mounted on each half-circuit.

Therefore, as the respective bars of the two groups of half-circuits are drawn along, the shelling and collecting devices, aligned transversally to the forward movement of said half-circuits, are drawn along simultaneously.

The total length of the upper half-circuits for shelling is calculated to allow space for an optimum number of shelling devices, for operating them and for preparing them to start a fresh cycle.

The length of the lower half-circuits is calculated in the same way for an optimum number of collecting devices, for space needed to collect the yolks, the whites and any waste, and for preparing said devices to do a new cycle.

Arrangement on a vertical plane of the trajectories taken by the shelling and collecting devices makes it possible to have the desired number of production lines placed one alongside another thus considerably raising output.

By having the series of shelling devices mounted on chains that are separate and independent from those for the collecting devices, an optimum number of devices of both kinds, even appreciably different, can be used since it is only necessary to arrange for the shelling device to encounter a collecting device at a certain moment during the stage of feeding each egg onto the shelling device.

The length of chains for shelling and collecting devices can therefore be calculated to allow for successful execution of all operations required for breaking the shells and collecting the yolks, white and waste. The possibility of mounting several of these devices on a single cross bar or similar means, greatly increases hourly output, reduces costs and simplifies machinery.

Operational checks and elimination of waste are also done simply and easily.

In relation to output given, the space occupied by the machinery is very small.

Characteristics and purposes of the invention will be made still clearer by the following examples of its operation illustrated by diagrammatic drawings.

BRIEF DESCRIPTION OF THE DRAWINGS

FIG. 5 Side view of the egg feeding machine and detail of the machine at the position of a shelling device when an egg has been deposited on it.

FIG. 6 Cross section of the egg feeding machine.

FIG. 7 Side view of the shelling device with a pressure head lowered onto the egg.

FIG. 8 Side view of the shelling device when the egg has been broken.

FIG. 13 Side view of the shelling device when passing by the toothed cam.

FIG. 14 The shelling device when the yolk drops out.

FIG. 15 The collecting device after movement of the release lever causing both the cup for the yolk and the tray for the white to tip over and allow waste to fall.

DESCRIPTION OF THE PREFERRED EMBODIMENTS

Figure 1:
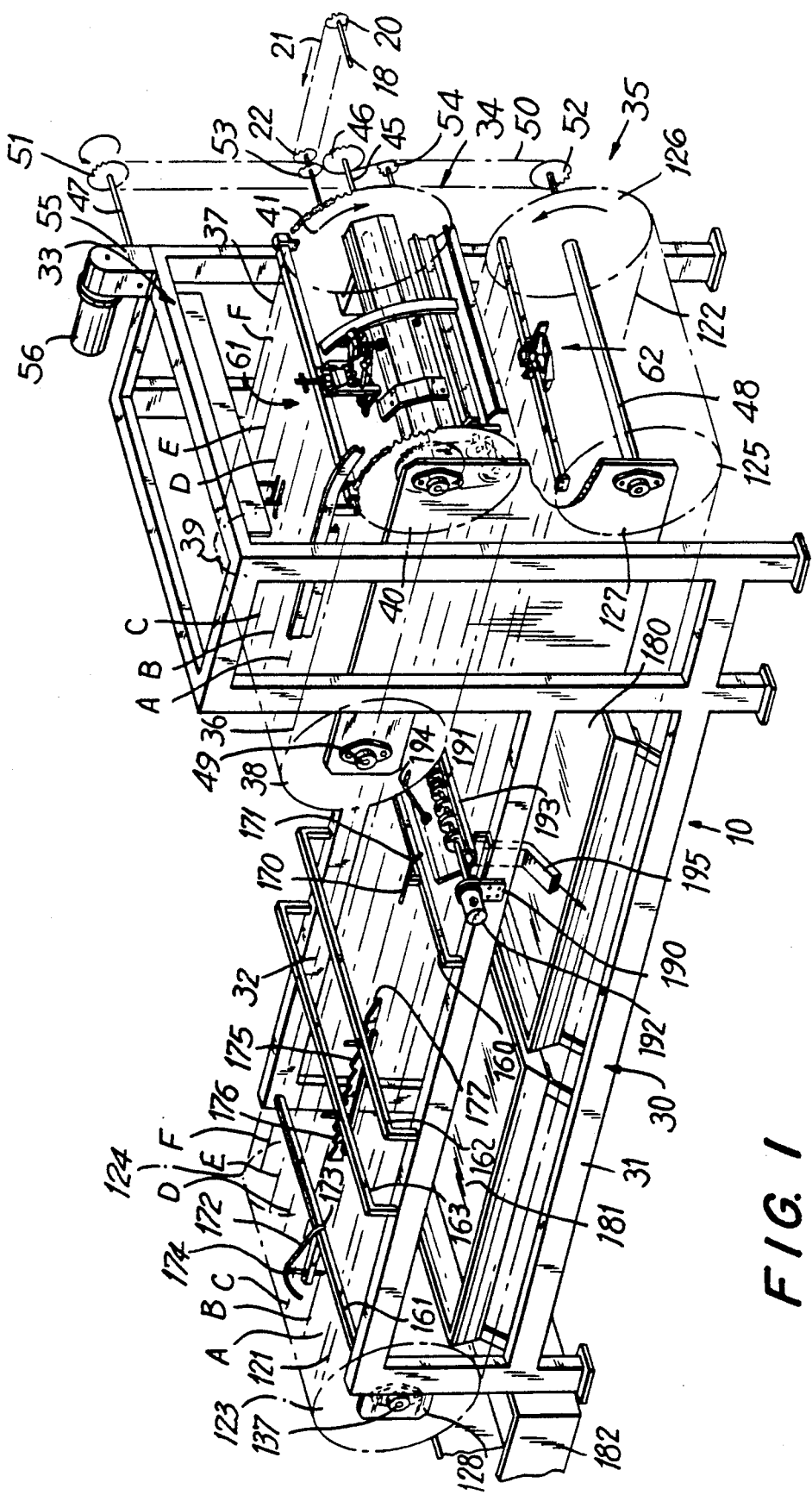
FIG. 1 Perspective of a machine with six production lines.

The egg shelling machine (10) is served by a machine (11) for washing the eggs and feeding them in, fitted with a conveyor (12) comprising a set of transversal bars (13) drawn along by a pair of annular chains (14) placed near the two sides, such as (15), and supported at both ends by pairs of cogwheels, such as (16) and (17), mounted on shafts (18) and (19).

The cogwheel (16) is fixed for kinematic connection to another cogwheel (20) (FIG. 6) by the chain (21) to the cogwheel (22) (FIG. 2) forming part of the motor drive of the egg shelling machine (10).

Each of the cross bars (13) is fitted with a shaped roller (23) comprising six shallow annular grooves (24) for carrying the eggs (25).

At one end these rollers have friction wheels, like (26), that turn in the race (27) in the side (15) so that, when rotating, these wheels cause the rollers to rotate as well. The washing sprayers (28) are mounted above the conveyor. The shelling machine (10) comprises a frame (30) for six parallel production lines indicated by the letters A, B, C, D, E, F.

As all production lines are substantially the same, the description of one line applies to the other five.

Each line comprises two sets of main devices.

The first set (34) lies above the second (35) and comprises a pair of annular chains (36-37) at the side supported by a pair of wheels (38-39) at the back mounted on shaft (49), and by a pair of front cogwheels (40-41) fixed to the shaft (45) on which the cogwheel (46) is mounted.

This latter wheel is turned with the aid of transmission wheels (53), (54), by the annular chain (50) supported at each end by the pair of cogwheels (51-52).

Cogwheel (51) is mounted on the shaft (47) of ratiomotor (55) whose motor (56) is mounted on the front end (33) of the frame (30).

The bars (60) which carry six devices (61) for breaking egg shells, are held to chains (36-37) by supports (63'), (63) at each end.

Each of said bars (60) is articulated on said supports and rotates in relation to them. The levers (64-65), fixed to said bar, keep it in the best position for operating the devices (61), and so always parallel to itself, aided by rollers (66-67) guided by U-shaped and L-shaped guides (68) and (69) respectively.

Figure 2:
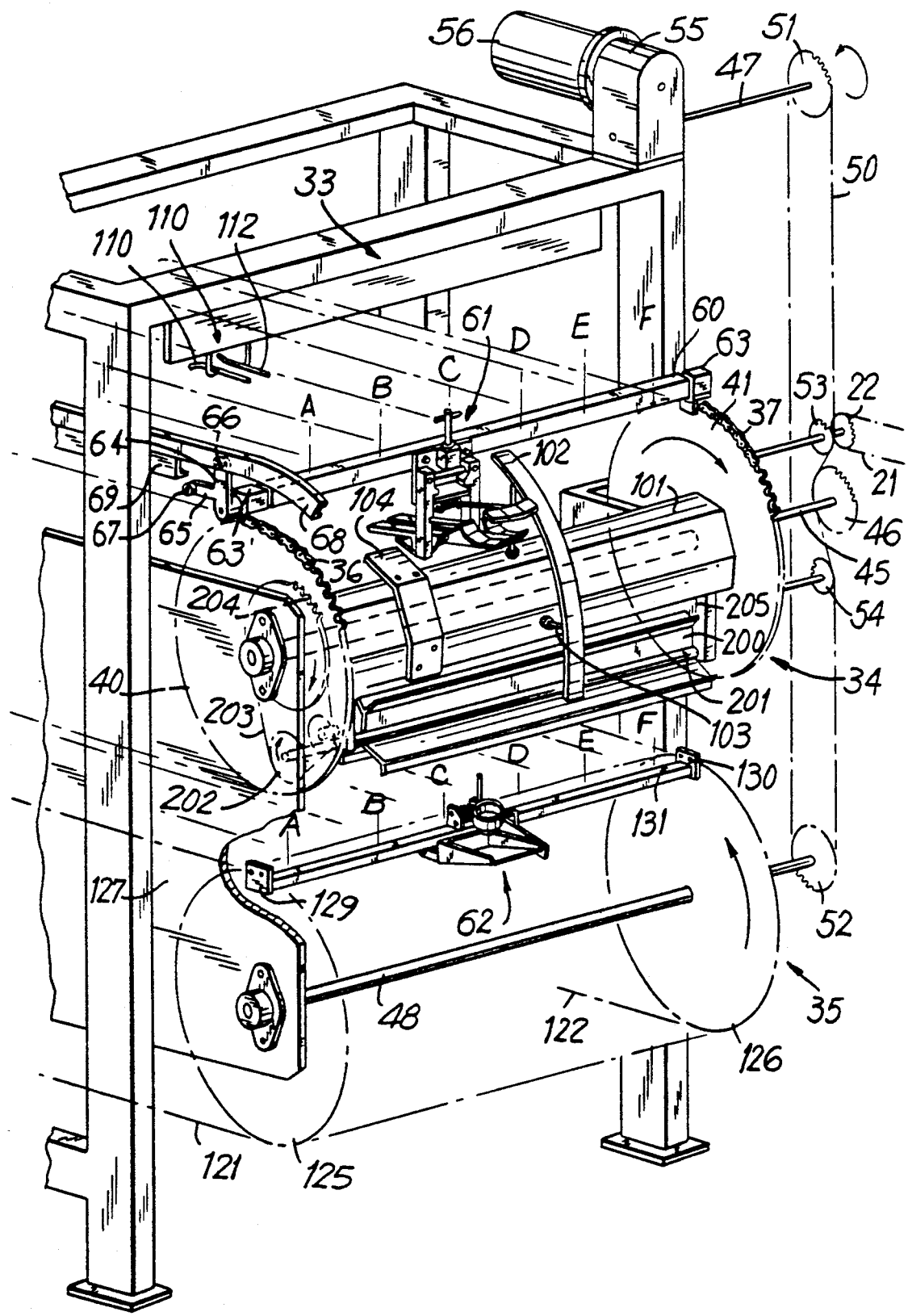
FIG. 2 The front of the machine.

In FIG. 2 these guides are only shown above the cogwheel (40), while in FIG. 9 they are seen below said wheel (40). Between that part of the guide (68-69) seen in FIG. 2 and that part of them seen in FIG. 9, posterior continuity exists at the point corresponding to the position of cogwheel (38). At the front there is no such continuity in order to keep the shelling device fixed to bar (60) in its correct position, namely parallel to itself, as will be explained further on referring to FIGS. 5 to 12.

Device (61) comprises the plate (70) fixed to the bar (60), said plate supporting, by pins (71-72), the vertical jaws (73-74) to which the half-pans (75-76) are in turn fixed by arms (77).

The cylindrical sliding means (79) slides vertically on support (80) fixed centrally to the plate (70). The slider has uppermost a cross bar (81) with two ends symmetrical in relation to the sliding means (79) and comprises lower down another cross bar (82) whose two ends, similarly symmetrical to the sliding means, rest on the inclined planes (83-84) of the two jaws (73-74).

Said jaws are kept one against the other, pressing on the cross bar (82) by means of springs (85).

Bar (90) also articulates centrally, in supports (86) and, by means of horizontal shaft (87), on plate (70). The bar supports at its front end the horizontal head (92) pressed down towards the half-pans by the spring (93).

At the back of bar (90) there is a horizontal transversal tailpiece (91).

At the lower ends of jaws (73-74) levers (98-99) articulates by means of horizontal pins (94) aligned and parallel to the plane on which said jaws lie. There are at the front ends of said levers respectively the parallel and converging blades (96-97) occupying a position within the space between the two half-pans (75-76).

When the jaws are not working the cross section of these two blades (96-97) assumes the form of an overturned "V".

Figure 3:
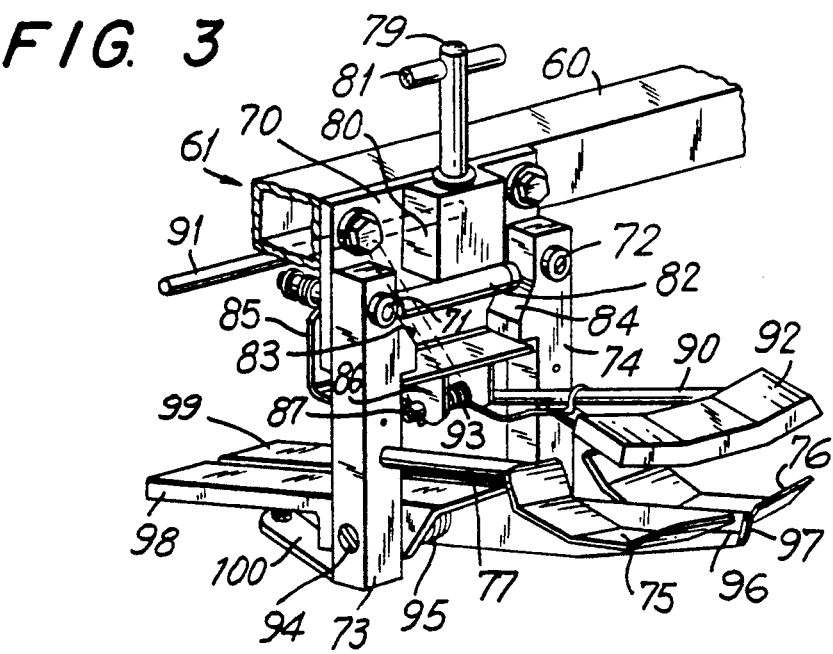
FIG. 3 Detail of the shelling device.

The springs (95) keep said blades at a level higher than that of the half-pans (75-76), as seen in FIG. 3, said position being regulated by a limit stop (100).

On the front (33) of the frame (30) of the machine a convex cowl (101) is mounted in a horizontal position practically enclosing the shaft (45) supporting the cogwheels (40-41). Held to said cowl by rods (103) is a fixed convex cam (102) placed on the trajectory followed by tailpiece (91) to bar (90) supporting the head (92) of the shelling device, and another convex cam (104) whose concave side faces onto the shaft (45). The latter cam lies on the trajectory described by levers (98-99) of blades (96-97) forming part of the aforesaid shelling device (61).

On the front (33) a guide (110) is mounted consisting of parallel bars (111-112) given a slightly upward slope and having divergent back ends. The guide is in line with the trajectory followed by the cross bar (81) at the top of the shelling device (61) to be explained in more detail further on.

The second set of devices (35) comprises a pair of annular chains (121-122) moving round a posterior pair of cogwheels (123-124) and an anterior pair (125-126). The front pair is fixed to the shaft (48) that turns on supports (127) mounted on the frame of the machine; said shaft carries a cogwheel (52) connected to another cogwheel (51) mounted on the shaft (47) of the ratiomotor.

The back pair of wheels of this second set of devices is mounted on the shaft (137) and rotates freely on supports (128) fixed to sides (31) and (32) of the machine.

The horizontal bar (131) supporting the device (62), for collecting and filtering eggs, is fixed to chains (121), (122) by supports (129), (130).

Said device (see FIG. 4) comprises the U-shaped support (132) fixed to the bar (131) on which lever (133) articulates by means of the horizontal pin (134). On the lower extremity (134) of lever (133) the end (144) of horizontal arm (140) makes contact thrust by the helical spring (135) wound round the pin (134). Said horizontal arm (140) turns on the horizontal transversal pin (141) supported by the parallel sides of the U-shaped support (132) above.

The cup (146) is supported on one side by a bracket (145) placed towards the front end of said arm (140), said cup having a sunk base (147) and slits round the sides (148), (149). Notches (142-143) are made in the underside of said arm to take the short horizontal side pin (159) in the tray (155). Said tray hinges, by means of an arm (157), on a pin (158) fixed to the bar (131).

The floor (156) of the tray (155) is upwardly inclined. A horizontal pin (150) is fitted to the other side of the cup. A cross piece (160), mounted on sides (31-32) of the machine, carries a longitudinal cam (170) whose initial end (171), facing the front of the machine, slopes downward. On two other cross pieces (162) and (163) mounted further back, beyond cam (175), there is another longitudinal cam (175) with teeth (176) and having an initially inclined plane (177).

Further back again, on the cross piece (161) fixed to the sides (31-32) of the machine, another upward inclined cam (172) with curved ends (173) and (174) is also placed longitudinally.

The purpose and mode of functioning of these cams (170), (175) and (172) will be explained in due course.

The first container (180) for collecting rejected eggs (183), the middle container (181) for collecting egg white (184) and the final container (182) for collecting yolks (185) are all placed on the bottom of the machine. Brackets (190) support the Archimedean screw (191) with its motor (192) on the frame of the machine. Said screw lies in the bottom of a channel (193) on one of whose edges a longitudinal ferrule (194) is mounted practically in the trajectory followed by device (61) to be explained further on.

The channel (193) has a drain pipe (195) leading from it. On the front (33) of the machine there is a rotor (200), having three equidistant radial blades (206), mounted on the shaft (201) between the main cogwheels (40), (41). Said rotor is turned by cogwheel (202) connected by a chain (203) to cogwheel (204) mounted on shaft (45). Each blade has a V-shaped channel, like (207) and (208), along its edge.

The figures show that the machine has six production lines each of which comprises a pair of upper chains (36-37) and a pair of lower chains (121-122). By means of two series of bars (51-131) said chains draw along a number of shelling devices, six for each bar, and a number of collecting devices, also six per bar. The distance between each of the bars for the upper and lower pairs of chains is such to ensure that the position of the shelling devices on one bar will correspond during the cycle with that of the collecting devices on the other bar, all coinciding with the six lines for washing the eggs and feeding them in as will be explained in greater detail further on.

OPERATION

Bearing in mind the direction of rotation of chain (36) and therefore the downward movement of device (61), FIG. 5 clearly shows the contact made by levers (98-99) with the convex cam (104) causing the knives (96-97) to move away from the two half-pans (75-76) on the shelling device (61), while the pull exerted by the concave cam (102) on the cross bar (91) fixed to the head (92) similarly moves said head away from the half-pans (75-76).

The egg (25) is carried along on the conveyor (14) with rollers (23) and is washed under the sprayer (11). From the conveyor (14) an egg (78) is moved onto the half-pans (75-76). As device (61) moves down, the movement of cross bar (91) away from the cam (102) causes the head (92) to be lowered onto the egg (78) (FIG. 7).

As soon as levers (98) detach themselves from the cam (104) the knives (96-97) rise sharply between the half-pans, striking the egg (78) and breaking its shell as seen in FIG. 8. At the same time the longitudinal channel (208) of one blade (206) of the rotor (200) mounted on the front of the machine (FIGS. 9-10), in its rotation puts increasing pressure on the head formed by the small cross piece (81) of the slider (79). This moves the slider down causing its lower cross piece (82) to press against the inclined planes (83-84) of the jaws (73-74) causing them to open, necessarily together with the half-pans (75-76) and together with the knives (96-97) as seen in FIG. 9.

Figure 9:
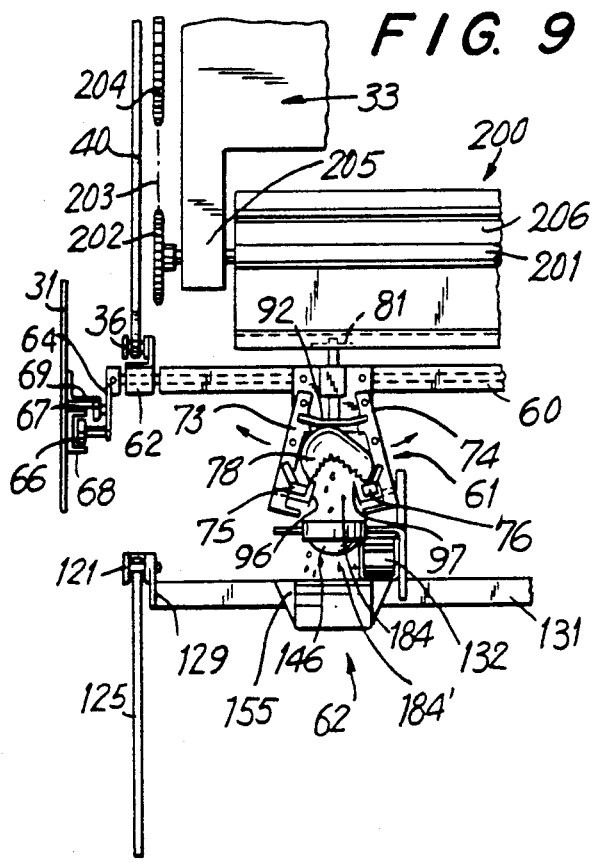
FIG. 9 Front view of the machine when the shell has opened in the shelling device.
Figure 10:
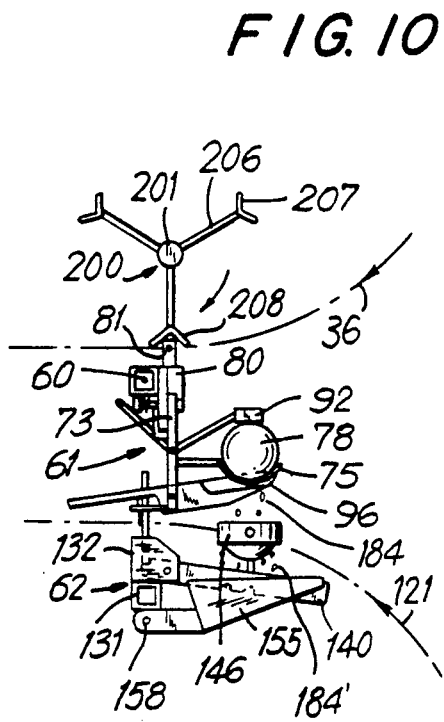
FIG. 10 Side view of the same.
Figure 11:
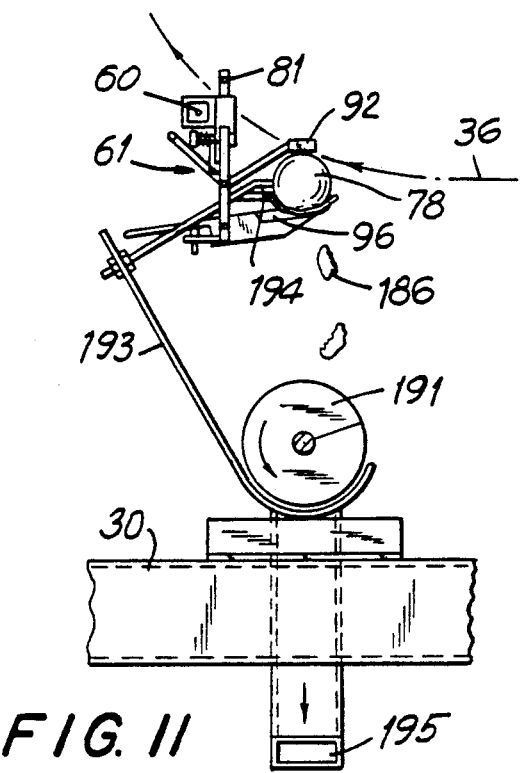
FIG. 11 Side view of the shelling device at the point where the Archimedean screw collects the broken shell.
Figure 12:
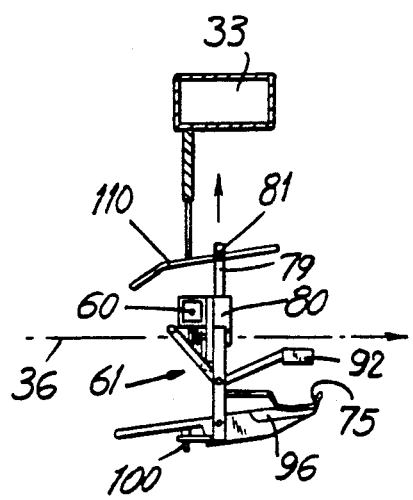
FIG. 12 Side view of the shelling device at the point where the cam prepares the device for a fresh cycle.

Meanwhile, one of the collecting devices (62), moving up from below, will reach a position in line with that of device 61 (FIGS. 9-10).

The shell having been broken into two parts, the contents of the egg will fall into the cup (146).

Once in the cup the yolk lies in the central depression while the white drips through the side slits (148-149) and collects in the tray (155) placed below.

Figure 4:
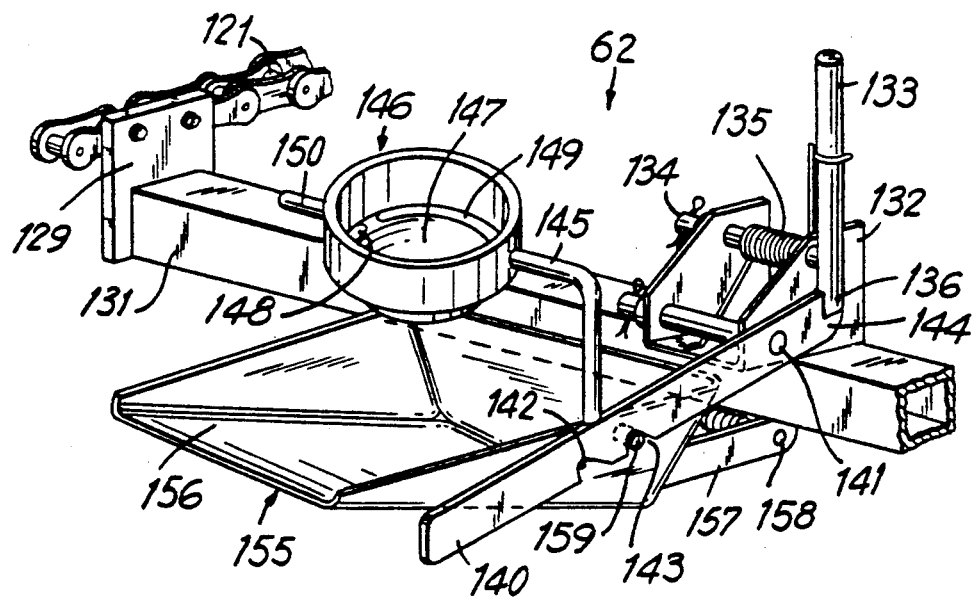
FIG. 4 Detail of the yolk and white collecting device.

As seen in FIGS. 4, 9 and 10, the cup is held in position by the end (144) of arm (140) which makes contact with the end (136) of the vertical lever (133). The position of the tray (155), as these same figures show, is maintained by the short pin (159) fitting into the notch (143) of the arm (140).

Proceeding downwards towards the inside of the machine, the shelling device (61) approaches the Archimedean screw (191) with the ferrule (194) above it. Said ferrule pushes the broken shell (186) off the half-pans (75-76) into the channel (193) of said screw which leads it down through a shaft (195) from where it drops into a container below.

Continuing its course the shelling device (61) passes along the top of the annular chains (36-37) thereby changing direction and returning to the front of the machine where the pair (110) of parallel guides (111-112) are suspended from an upper cross bar. These guides then raise the two arms of the head (81) of the slider (79) (FIG. 12) so bringing the device in FIG. 3 into position for a new cycle. In the case of the collecting device (62), when the yolk is in the cup (146) and the white in the tray (155), said device proceeds along its path into the inside of the machine encountering the horizontal longitudinal cam (175) with its upward inclined end (177) followed by the set of upward inclined saw teeth (176) with which the horizontal side pin (150) on the cup.

Said inclined end (177) of said cam raises the cup (146) and therefore its supporting arm (140) so releasing the side pin (159) in the tray (155) from the notch (143) in said arm. Thus deprived of its support the tray overturns allowing the egg white to fall into the container (181) placed below in the machine (FIG. 13) while the yolk still remains in the cup (146).

Any white left adhering to the yolk is detached by shaking received from the passage of the pin (150) of the cup (146) across the saw teeth of the cam (175) on which, in passing, said pin rests by force of gravity.

Having crossed the toothed cam the collecting device encounters another longitudinal cam (172) comprising an up-inclined plane over which the tray's side pin (159) moves. The tray is therefore raised from its vertical position to its horizontal working position with the side pin (159) once more in the notch (143) of the arm (140) supporting the cup (146), and so the device is prepared for another cycle.

The collecting device then begins its descent and passes from the upper section of the chain, moving to the back of the machine, to the lower section moving in the opposite direction, namely towards the front of the machine. This passage causes the device to overturn and the yolk (185) to fall from the cup (146) into the container (182) below.

Carrying on from there the collecting device is once again directed to the front of the machine reaching, for example, the position seen in FIGS. 1 and 2.

If the egg is abnormal, defective or to be rejected for any other reason, this can be done immediately by moving lever (133) (FIG. 15) while the collecting device is in the initial horizontal stretch after breakage of the shell. By pushing lever (133) to position (133') its tip (136) is released from the end (144) of arm (140). At the same time the short pin (159) in the tray (155) is released from the notch (143) causing both cup (146) and tray (155) to tip over as in FIG. 15, and the contents (183) of both cup and tray to drop by force of gravity into the container (180) (FIG. 1).

Continuing its course, the pin (159) in the tray (155) of the collecting device meets the cam (170) with its inclined plane (171) that causes the tray (155) to rise till its above pin fits into notch (142) (FIG. 4) of the supporting arm (140) of the cup (146).

This partially returns the device to its normal working position, sufficiently to allow the cup's pin (150) to pass under the saw-toothed cam (175). Further on the collecting device meets the cam (172) that enables the pin (159) in the collecting tray to enter the inner notch (143) of arm (140) (FIG. 4) putting the device back to its working configuration in FIG. 4 ready to begin a fresh cycle.

I claim:

1. Automatic egg shelling machine characterized in that it has a plurality of parallel production lines (A, B, C, D, E, F) placed side by side travelling along endless paths in vertical planes, each composed of two half-circuits, one above the other, an upper one of the half-circuits for carrying and conveying shelling devices (61) along vertical endless paths for collecting eggs as they are supplied on an egg feeding device (11) and for breaking their shells and a lower one of the half-circuits for carrying and conveying collecting devices (62) to collect the yolks and whites, speed of said two half-circuits being equal but moving in opposite directions, operative planes of said half-circuits being regulated so that during operation meeting is assured between an upward moving collecting device (62) and a downward moving shelling device (61), said upper half-circuits being formed of a pair of lateral continuous chains (36) (37) moving around horizontal axes along paths in vertical planes and connected by transversal bars (60) each of which carries one of the egg shelling devices (61) on each half-circuit set side by side, while the lower half-circuits are formed of a pair of continuous lateral chains (121) (122) moving around horizontal axes along paths in vertical planes and connected by transversal bars (131) each carrying one of the collecting devices (62) on each half-circuits set side by side.

2. Automatic egg shelling machine as in claim 1 characterized in that each shelling device (61) comprises two half-pans (75) (76) placed side by side, to receive each egg, said half-pans being respectively fixed to two jaws (73) (74) articulated on a supporting means (70) and drawn together by reaction springs (85), two upward facing blades (96) (97) placed side by side between said half-pans (75) (76) and articulated on said jaws (73) (74) and a central head (92) used for pressing on the egg, articulated on the supporting means (70), there being, on a front (33) of a structure carrying the half circuits, fixed cams (102) (104), which, before each shelling device reaches egg feeder (11), move the pressure head (92) and the blades (96) (97) away from the half-pans (75) (76) allowing the latter to receive the egg from the feeder (11) and, immediately after, due to the effect of reaction springs (93), cause said pressure head (92) to lower itself onto the egg (78) and blades (96) (97) to move towards it and break the shell (78) into two pieces, there also being on the front (33) of the carrying structure (30) a horizontal rotor (200) equipped with longitudinal radial blades (206) having outward facing channel-shaped edges (207) (208), constantly rotating to coincide with the sliding movement of the shelling device (61) so that, as soon as an eggshell (78) has been broken, said channels (207) (208) lower a pressure piston (78) which, in turn, causes separation of jaws (73) (74) together with the half-pans (75) (76) and blades (96) (97) and therefore separation of the halves of the eggshell (78) allowing the white (184) and yolk (185) to fall into the collecting device (62), after which cams (110) mounted for this purpose on the supporting structure (30) raise the above piston (79) while, due to the effect of reaction springs (85), jaws (73) (74) return to their initial closed position ready to begin a fresh shelling cycle.

3. Automatic egg shelling machine as in claim 1, characterized in that the collecting device (62) comprises a cup (146) shaped with a central sunken area (147) to receive the yolk and having periferal apertures (148) (149) through which the white (184) drops into a tray (155) below, said cup (146) being supported by an articulated arm (140) kept horizontal by a posterior projection (144), the tray (155) being supported by an articulated arm (157) kept horizontal by a pin (159) in said tray (155) fitting into a notch (143) made on the arm (140) supporting the cup (146), there being a horizontal longitudinal cam (175) mounted on the structure (30) supporting the half-circuits, said cam having an upward inclined plane (177) followed by a set of saw teeth (176), so that when the yolk (185) has fallen into the cup (146) and the white (184) into the tray (155), said inclined plane (177) raises said cup (146) until the notch (143) in the arm (140) becomes detached from the lateral pin (159) in the tray (155), which tray, rotating downward by gravity, causes the white (184) to fall into a container (181) below, the remaining white adhering to the yolk (185) becoming detached when the cup (146) is shaken during its passage across the saw teeth (176), said collecting device (62) being then conveyed from the upper lengths of chain (121) (122) directed towards the back of the supporting structure (30) to the lower lengths of chain directed in the opposite direction namely towards the front (33) of said structure (30) and thereby causing the collecting device (62) to overturn completely allowing the yolk (185) to fall from the overturned cup (146) into a container (182) below.

* * * * *